Jan. 9, 1923. 1,441,546

L. W. THOMPSON.
REGULATION OF ELECTRIC CIRCUITS.
FILED AUG. 27, 1919.

2 SHEETS-SHEET 1

Inventor:
Louis W. Thompson,
by His Attorney.

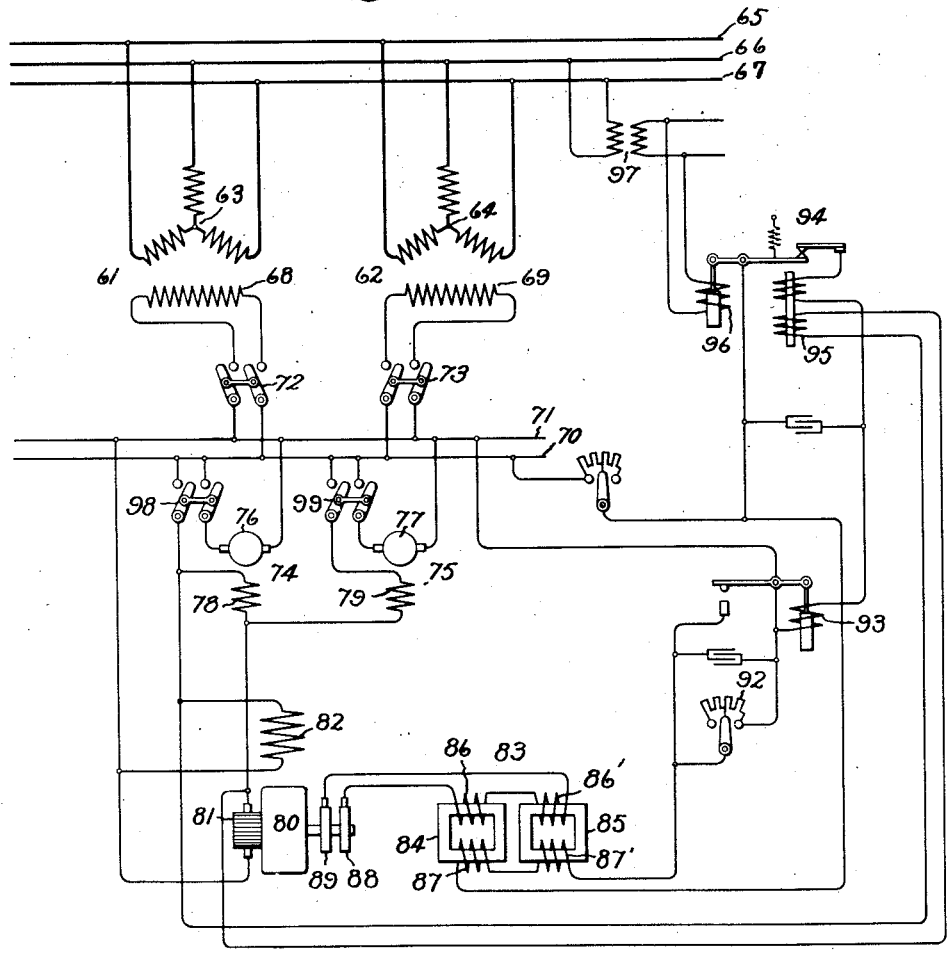

Patented Jan. 9, 1923.

1,441,546

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATION OF ELECTRIC CIRCUITS.

Application filed August 27, 1919. Serial No. 320,245.

*To all whom it may concern:*

Be it known that I, LOUIS W. THOMPSON, a citizen of the United States, residing at Schenectady, in the county of Schenectady, State of New York, have invented certain new and useful Improvements in the Regulation of Electric Circuits, of which the following is a specification.

My invention relates to the regulation of electrical circuits. The object of my invention is to provide a new and improved means for regulating an electrical condition of a circuit. The particular condition selected will depend upon circumstances and obviously may be the voltage, current or some other function of the energy of the circuit. For simplicity, I shall describe my invention in connection with voltage regulation.

More particularly my invention comprises a rotary transforming means, one side of which is connected in a circuit which may be the circuit to be regulated or a circuit the regulation of which determines the electrical condition of the circuit to be regulated. The other side of the transformer means is connected to a circuit in the nature of a load circuit for the transforming means and means are provided for controlling the amount of current that is permitted to flow in this load circuit to vary the regulating effect of the transforming means. Automatic means are preferably arranged to control the admittance of the load circuit in accordance with incipient variations in the electrical condition of the circuit to be regulated.

While of particular utility in connection with the regulation of the field circuits of dynamo-electric machines, my invention is not in its broadest aspects limited to such use.

Figure 1:
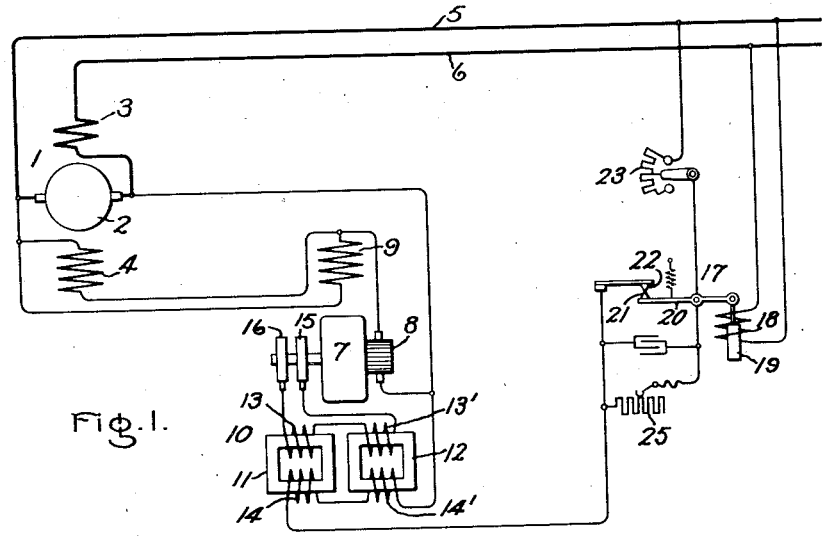
Figure 2:
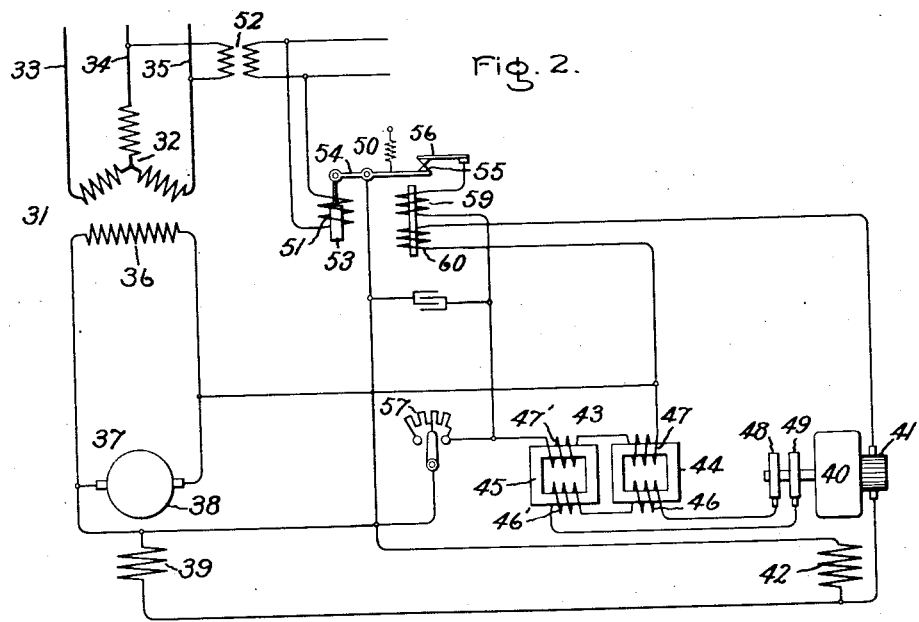

My invention may best be explained by referring to the accompanying drawings, Fig. 1 of which shows diagrammatically a modification of my invention embodied in a regulating system for a direct current generator; Fig. 2 of which shows diagrammatically a modification of my invention embodied in a regulating system for an alternating current generator; and Fig. 3 of which shows diagrammatically a modification of my invention embodied in a regulating system for one or more alternating current generators which are adapted to be excited from one or more exciters.

Referring to Fig. 1 of the drawing, 1 represents a direct current generator having an armature 2, a series field winding 3, and a shunt field winding 4. The generator 1 is connected to supply current to the mains 5 and 6. 7 represents a rotary transforming means which I have illustrated as being an inverted rotary converter having a commutator 8 connected in series with the shunt field winding 4 of the generator 1, a field winding 9 connected in multiple to the shunt field winding 4, and a pair of slip rings 15 and 16. 10 denotes inductive means comprising the cores 11 and 12 of suitable magnetic material, upon which are located windings 13 and 13'. The windings 13 and 13' are connected in series across the slip rings 15 and 16 of the rotary transforming means 7. The cores 11 and 12 are also provided with magnetizing windings 14 and 14' which are adapted to be energized by direct current supplied from generator 1 through the adjustable resistances 23 and 25. The purpose of providing two cores is so that the windings 14 and 14' may be arranged thereon in such a manner with respect to the windings 13 and 13' that substantially no induced currents are caused to flow therein by reason of the alternating current in the windings 13 and 13', and in order to obtain this result I prefer to arrange the windings as shown in the drawing. 17 represents a vibratory device for controlling the energization of the coils 14 and 14' and comprises a winding 18 connected across the mains 5 and 6, a movable core 19, a movable arm 20 connected to be actuated by said core, a movable contact 21 carried by said arm, and a stationary contact 22 cooperating with the movable contact 21. The contacts 21 and 22 are connected to the terminals of the adjustable resistance 25.

The operation of the modification illustrated in Fig. 1 as at present understood is as follows:

Assume the generator 1 is delivering a voltage to the mains 5 and 6 which is below a desired predetermined value. The core 19 of the vibratory device 17 will be in its lower position and the movable contact 21 will be in engagement with the stationary contact 22 so that resistance 25 in the circuit of the windings 14 and 14' is short-circuited. The amount of current that flows through the coils 14 and 14' at this time is of such a value as to magnetize the cores 11 and 12, thereby reducing the inductance of the windings 13 and 13' whereupon the current flowing therethrough is increased, causing, in a manner well understood in the art, a corresponding increase in the direct-current supplied to the rotary transforming means 7. The amount of current through the field winding 4 is thereby increased causing a corresponding increase in voltage of the generator 1. Upon the voltage across the mains 5 and 6 increasing above the predetermined value, the core 19 of the vibratory device 17 moves upward and moves the contact 21 out of engagement with the stationary contact 22. The high resistance 25 is thereby inserted in the circuit of the coils 14 and 14' so as to reduce the current therein, thereby increasing the inductance of the coils 13 and 13', whereupon the current flowing therethrough is reduced, causing in turn a corresponding decrease in the amount of current flowing through the field winding 4 of the generator 1 so as to decrease the voltage generated by the generator 1. When the voltage across the mains 5 and 6 again reaches a value below the predetermined value, the resistance 25 is again short-circuited and the cycle of operation repeated. The operation during one vibration of the device 17 has been described as though it were independent of the other vibrations but it will be understood that in the normal operation, the contact 21 vibrates rapidly and when the voltage across the mains 5 and 6 is below the predetermined value the contacts 21 and 22 will be in engagement and the resistance short-circuited a greater portion of the time than when the voltage across the mains 5 and 6 is above the predetermined value, so as to maintain the voltage substantially constant at the predetermined value.

Referring to Fig. 2, wherein is shown a regulating system for an alternating current generator, 31 represents an alternating current generator having an induced winding 32 connected to supply current to the mains 33, 34 and 35 and an inducing or field winding 36 connected to be energized by an exciter 37. The exciter 37 comprises an armature 38 and a shunt field winding 39. 40 represents a rotary converter having a commutator 41 connected in series with the shunt field winding 39 of the exciter 37, a field winding 42 connected in multiple with the field winding 39, and the slip rings 48 and 49. 43 denotes inductive means comprising the cores 44 and 45 consisting of suitable magnetic material upon which are wound the windings 46 and 46'. The windings 46 and 46' are connected in series across the slip rings 48 and 49 of the rotary converter 40. The cores 44 and 45 are also provided with magnetizing windings 47 and 47' which are adapted to be energized by direct current supplied from the exciter 37.

50 represents a vibratory device having a winding 51 connected to the mains 34 and 35 by means of a potential transformer 52, a movable core 53, a movable arm 54 connected to be actuated by said core, a movable contact 55 carried by the arm 54, and a stationary contact 56 cooperating with the movable contact 55. The windings 47 and 47' of the inductive means 43 are connected in series with the adjustable resistance 57 across the armature 38 of the exciter 37. One terminal of the resistance 57 is connected to the movable contact 55 of the device 50 and the other terminal of the resistance 57 is connected in series with a winding 59 associated with the vibratory device 50 to the stationary contact 56. The exciter field winding 39 and the rotary converter field winding 42 are connected in series with the commutator 41 of the rotary converter and a winding 60 associated with the vibratory device 50 across the armature of the exciter 37. The windings 59 and 60 are preferably mounted upon a core and cooperate with the movable arm 54 in a manner and for a purpose hereinafter described.

Referring to Fig. 3 wherein is shown a regulating system with one or more alternating current generators comprising a plurality of exciters adapted to be operated singly or in parallel, 61 and 62 represents alternating current generators having induced windings 63 and 64 connected to supply current to the mains 65, 66 and 67, and inducing or field windings 68 and 69 adapted to be connected to the exciter buses 70 and 71 by means of switches 72 and 73. 74 and 75 represent exciters having armatures 76 and 77 and shunt field windings 78 and 79. 80 represents a rotary transformer means which is similar in all respects to the rotary converter shown in Fig. 2 except that the field winding 82 is connected directly across the buses 70 and 71 instead of being connected in series with the commutator 81 of the rotary converter 80 as shown in Fig. 2.

Corresponding terminals of the field windings 78 and 79 are connected through commutator 81 of the rotary converter 80 to the bus 71 to which are also connected corresponding terminals of the armatures 76 and 77. The other terminals of the armatures 76 and 77 and of the field windings 78 and 79 may be connected to the bus 70 by means of the switches 98 and 99.

83 denotes inductive means comprising cores 84 and 85 which consists of suitable magnetic material upon which are located the windings 86 and 86'. The windings 86 and 86' are connected in series across the slip rings 88 and 89 of the rotary converter 80. The cores 84 and 85 are also provided with magnetizing windings 87 and 87' which are adapted to be energized by direct current supplied from the buses 70 and 71. The purpose of providing two cores 84 and 85 is so that the windings 87 and 87' may be so arranged thereon in such a manner with respect to the windings 86 and 86' that substantially no induced currents are caused to flow therein by reason of the alternating current in the windings 86 and 86', and in order to obtain this result I prefer to arrange these windings in the manner shown in the drawing.

The windings 87 and 87' of the inductive means 83 are connected in series with an adjustable resistance 92 across the buses 70 and 71. The effectiveness of the resistance 92 is varied by means of a relay 93 the operation of which is controlled by a vibratory device 94. This vibratory device is similar to the vibratory device 50 illustrated in Fig. 2 but the winding 95 corresponding to the winding 60 is connected in shunt to the exciter field winding 78 instead of in series as shown in Fig. 2. The vibratory device 94 is provided with a winding 96 which corresponds to the winding 51 in Fig. 2 and is connected through a potential transformer 97 to the mains 66 and 67.

The operation of the modification illustrated in Fig. 2, as at present understood, is as follows:

Let it be assumed that the alternating current generator 31 is in operation and that its field winding 36 is energized to an extent just sufficient to cause it to maintain the desired predetermined voltage across the mains. The vibratory device 50 will then be in operation and the period during which the cooperating contacts 55 and 56 are engaged will bear such a relation to the period during which they disengaged that the rotary converter 40 will maintain, through its control of the energization of the exciter field winding 39, the energization of the field winding 36 of the alternating current generator 31 at the proper value. It will be noted that upon the engagement of contacts 55 and 56 the resistance in series with the windings 47 and 47' is short-circuited and at the same time the winding 59 is energized. The winding 59 when energized attracts one end of the movable arm 54, which is of magnetic material, thereby tending to disengage the contacts 55 and 56. The winding 59 which comprises the anti-hunting winding causes a rapid vibration of the movable arm 54 independent of the variations in the voltage of the mains 34 and 35 and prevents hunting which would occur by reason of the time lag of the system, if no such device were provided. If the voltage of the mains 34 and 35 decreases below the predetermined value, the contacts 55 and 56 will be in engagement a greater portion of the time and consequently the current through the field winding 39 will be increased thereby increasing the voltage of the exciter 37 and consequently the voltage of the generator 31.

Similarly if the voltage across the mains 34 and 35 increase above the aforesaid predetermined value the contacts 55 and 56 will be in engagement a less portion of the time and consequently the currents through the field winding 39 and 36 will be decreased, thereby decreasing the voltage of the generator 31. Hence the operation of the vibratory device 50 is modified upon a slight variation of the voltage across the mains 34 and 35 from the predetermined value so as to maintain the generator voltage substantially constant. When, as frequently happens, the exciter is operated well up on its saturation curve during heavy loads on the generator under-compounding of the generator may occur, since under these conditions a given variation in the exciter field excitation does not produce a corresponding variation in the exciter voltage. To compensate for this undercompounding effect the winding 60 associated with the vibratory device 50 is employed on the same core with winding 59. The winding 60 is traversed by current which energizes the field winding of the exciter and is wound differentially with respect to winding 59. Consequently when a heavy current traverses the field winding 39, the winding 60 will modify the action of the anti-hunting winding 59 so as to tend to maintain the contacts 55 and 56 closed a greater portion of the time, thereby increasing the current traversing the exciter field winding 39 and causing the generator 31 to develop a higher voltage.

The operation of the modification illustrated in Fig. 3 is believed not to require a detailed description other than to point out wherein it differs from the modification shown in Fig. 2. It will be noted that the vibratory device 94 is provided with a winding 95 which corresponds in function with the winding 60 associated with the vibratory device 50 in Fig. 2 and which is connected in multiple to the field winding 78 of the exciter 74. If it is necessary to operate only one of the exciters, the exciter 74 should therefore be used. In this modification it will also be noted that a relay 93 is interposed between the vibratory device 94 and the resistance 92 which is controlled thereby. The currents traversing the field windings 78 and 79 both traverse the commutator of the rotary converter 80.

While I have shown rotary transforming means for transforming electrical energy from a direct current circuit to an alternating current circuit, and means for varying the reactance of the alternating current circuit so as to vary the current in the direct current circuit and prefer to use these means because the energy used in regulation is small since the load for the transforming means is reactive I wish it to be understood that my invention is not limited to the particular transformer means illustrated nor to the particular means for varying the transformed current so as to vary current in the circuit from which the transformed current is supplied because it is evident to those skilled in the art that these means may take other forms than those illustrated without departing from the spirit of my invention.

While I have herein shown and described several modifications and applications of my invention, I do not desire to be limited to the exact arrangements shown and described but seek to cover in the following claims all those modifications and applications which come within the true spirit and scope of my invention.

What I claim as new and desire to secure by Letters Patent of the United States, is:—

1. In a regulating system the combination of an electric circuit, a source of current connected thereto, a circuit of variable admittance, rotary transforming means interposed between said circuits and arranged to transform electrical energy from said first mentioned circuit to said circuit of variable admittance, and means for controlling the admittance of said variable admittance circuit to vary the current in said first mentioned circuit.

2. The combination with a dynamo electric machine, of regulating means therefor comprising an electric circuit, rotary transforming means interposed between said circuit and the field circuit of said machine and adapted to transform electrical energy from said field circuit to said electric circuit, and means for varying an electrical condition of said electric circuit to vary the current in the field circuit.

3. The combination with a dynamo electric machine, of regulating means therefor comprising a circuit of variable admittance, rotary transforming means interposed between said circuit and the field circuit of said machine and adapted to transform electrical energy from said field circuit to said electric circuit, and vibratory means for varying the admittance of said circuit to vary the current in the field circuit.

4. The combination with a dynamo electric machine, of regulating means therefor comprising an electric circuit, a rotary converter interposed between said circuit and the field circuit of said machine and adapted to supply alternating current to said electric circuit, and means for varying an electrical condition of said electric circuit to vary the current in the field circuit.

5. The combination with a dynamo electric machine, of regulating means therefor comprising a circuit of variable admittance, a rotary converter interposed between said circuit and the field circuit of said machine and adapted to supply said circuit with alternating current, and vibratory means for varying the admittance of said circuit to vary the current in the field circuit.

6. The combination with a dynamo electric machine, of regulating means therefor comprising an electric circuit, a rotary transformer interposed between said circuit and the field circuit of said machine, and adapted to supply said electric circuit with alternating current, and means for varying the inductance of said electric circuit to vary the current in the field circuit.

7. The combination with a circuit to be regulated, a rotary converter having its direct current side connected in said circuit, a magnetizable core, a winding thereon connected to the alternating current side of said rotary converter, and means for varying the reluctance of said magnetizable core to control the current in the circuit to be regulated.

8. The combination with a circuit to be regulated, a rotary converter having its direct current side connected in said circuit, a magnetizable core, a winding thereon connected to the alternating current side of said rotary converter, a second winding on said core arranged to be excited by direct current, and means whereby the energization of said direct current winding may be varied to control the current in the circuit to be regulated.

In witness whereof, I have hereunto set my hand this 26th day of August 1919.

LOUIS W. THOMPSON.